(12) United States Patent
Kuechler

(10) Patent No.: US 8,199,702 B2
(45) Date of Patent: Jun. 12, 2012

(54) BASEBAND RECOVERY IN WIRELESS NETWORKS, BASE TRANSCEIVER STATIONS, AND WIRELESS NETWORKING DEVICES

(75) Inventor: Tim Kuechler, Calgary (CA)

(73) Assignee: Rockstar Bidco LP, New York, NY (US)

( * ) Notice: Subject to any disclaimer, the term of this patent is extended or adjusted under 35 U.S.C. 154(b) by 663 days.

(21) Appl. No.: 12/344,398

(22) Filed: Dec. 26, 2008

(65) Prior Publication Data
US 2010/0165915 A1 Jul. 1, 2010

(51) Int. Cl.
*H04W 4/00* (2009.01)
(52) U.S. Cl. ........................................ 370/328
(58) Field of Classification Search .................. 370/328
See application file for complete search history.

(56) References Cited

U.S. PATENT DOCUMENTS

| | | | |
|---|---|---|---|
| 5,566,213 A | 10/1996 | Carsello | |
| 6,347,127 B1 | 2/2002 | Chen | |
| 6,501,810 B1 | 12/2002 | karim et al. | |
| 6,625,233 B1 | 9/2003 | Carsello | |
| 6,795,510 B2 | 9/2004 | Edde | |
| 2002/0181633 A1* | 12/2002 | Trans | 375/354 |
| 2003/0143951 A1* | 7/2003 | Challa et al. | 455/20 |
| 2005/0147194 A1 | 7/2005 | Koenenkamp | |
| 2006/0280266 A1 | 12/2006 | Li | |
| 2008/0101515 A1 | 5/2008 | Yang | |
| 2008/0151940 A1 | 6/2008 | Fanson et al. | |

FOREIGN PATENT DOCUMENTS
WO  WO 99/27671  3/1999

OTHER PUBLICATIONS

Written Opinion of the International Searching Authority from corresponding PCT application PCT/CA2009/001673.
Digital Communications, Carrier and Symbol Synchronization, pp. 333-373. More relevant information at pp. 358+. www.mhhe.com/engcs/electrical/proakis/graphics/images/pro21113_060303.jpg 3 pages.
D. Nguyen, et al., Maximum Likelihood (ML) Symbol Tiing Recovery (STR) Techniques for Reconfigurable PAM and QAM Modems (Wireless Personal Communications, vol. 41, May 2007.

(Continued)

*Primary Examiner* — Gary Mui
*Assistant Examiner* — Richard K Chang
(74) *Attorney, Agent, or Firm* — Anderson Gorecki & Manaras LLP

(57) ABSTRACT

Baseband recovery in wireless networks, base transceiver stations, and wireless networking devices may be implemented to minimize the number of timing symbols while at the same time enabling wireless devices to use a relatively low per-symbol sampling rate, so that minimal processing is required to implement the timing recovery. In one embodiment, a relatively low number of samples is taken per expected symbol interval during the training sequence. A subset of the samples is selected and processed to determine error signals for each of the samples. The error signals are multiplied by the expected symbol and summed to form an error signal. The error signal is used to adjust the set of samples that will be used and processed in connection with subsequent symbols. The error signal is also used to interpolate between available samples to infinitesimally approach the point of maximum eye opening.

20 Claims, 6 Drawing Sheets

OTHER PUBLICATIONS

H. Tang et al, Interpolation-Based Maximum Likelihood Channel Estimation Using OFDM Pilot Symbols (5 pages).

M. Makundi et al., Efficient Symbol Synchronization Techinques using Variable FRI or IIR Interpolation Filters (abstract 1 page), May 2003.

E. Jacobsen "A Brief Examination of CQPSK for CPE PHY Modulation" Feb. 17, 2000 (10 pages).

TIA Standard, Project 25, TIA-102.BAAA-A (Sep. 2003), pp. 1 and 35-46.

* cited by examiner (Receive Waveform)

(Obtain samples)

(Compare samples with expected waveform)

(Adjust sampling window)

BASEBAND RECOVERY IN WIRELESS NETWORKS, BASE TRANSCEIVER STATIONS, AND WIRELESS NETWORKING DEVICES

BACKGROUND OF THE INVENTION

1. Field of the Invention

The present invention relates to wireless communication networks and, more particularly, to baseband recovery in wireless networks, base transceiver stations, and wireless networking devices.

2. Description of the Related Art

Data communication networks may include various computers, servers, nodes, routers, switches, bridges, hubs, proxies, access devices such as Customer Premises Equipment (CPE) and handsets, and other network devices coupled to and configured to pass data to one another. These devices will be referred to herein as "network elements." Data is communicated through the data communication network by passing encrypted on non-encrypted protocol data units, such as Internet Protocol (IP) packets, encoded and either compressed or non-compressed voice packets, Ethernet Frames, data cells, segments, or other logical associations of bits/bytes of data, between the network elements by utilizing one or more communication links between the devices. A particular protocol data unit may be handled by multiple network elements and cross multiple communication links as it travels between its source and its destination over the network.

In a wireless network, radio frequency (RF) signals are used to transmit data between network elements. Typically, a transmitter will include a RF transmitter that includes a data modulation stage that converts raw data into baseband signals in accordance with the particular wireless communication standard in use on the network. The baseband signals are then modulated by the RF transmitter onto a radio frequency (RF) carrier for transmission on the network. The modulated RF carrier is then amplified and transmitted via an antenna over the air as electromagnetic energy.

Many different modulation schemes have been devised to enable data to be transmitted on wireless networks. One example modulation scheme is commonly referred to as Orthogonal Frequency Division Multiplexing (OFDM). In OFDM, high-speed data signals are divided into tens or hundreds of lower speed signals that are transmitted in parallel over respective frequencies (subcarriers) within a radio frequency (RF) signal. The frequency spectra of the subcarriers may overlap so that the spacing between them is minimized. The subcarriers are also orthogonal to each other so that they are statistically independent and do not create crosstalk or otherwise interfere with each other. In OFDM, each block of data is converted into parallel form and mapped into each subcarrier as frequency domain symbols. To get time domain signals for transmission, an inverse discrete Fourier transform or its fast version, IFFT, is applied to the symbols. One network that uses OFDM as the modulation scheme is commonly referred to as WiMax. WiMax is defined by the IEEE 802.16x suite of protocols. Another emerging standard that has not yet been ratified, but appears likely to use the OFDM modulation scheme is referred to as Long Term Evolution (LTE). Other networking protocols may also use OFDM.

Another example modulation scheme that may be used to modulate the baseband signals for transmission is commonly referred to as Time Division Multiple Access (TDMA). In a TDMA network, the entire frequency spectrum is used to transmit data for a particular channel during a particular time interval. Different channels are allocated different time slots during which data associated with that channel will be transmitted. One example of a wireless network that uses TDMA as the modulation scheme is commonly referred to as Global System for Mobile Communication (GSM), although other wireless communication protocols also use time division to divide the channel into multiple subchannels.

Law enforcement and emergency personnel frequently use push-to-talk radio systems to communicate with each other. One type of communication system that has been implemented for law enforcement and other public safety radio networks is defined by the Project 25 (P25). Project 25 is defined by a suite of protocols developed by the Telecommunications Industry Association (TIA), for example TIA 102-BAAA-A. In the United States, the commercial implementation of TIA 102.BAAA-A is commonly referred to as APCO project 25 or simply APCO 25. In Europe, the implementation of the P25 standard is commonly referred to as Terrestrial Trunked Radio (TETRA).

The P25 Phase 1 specification includes two alternative digital modulation schemes, C4FM and CQPSK. C4FM is a constant-envelope, four-level frequency modulation scheme that operates in 12.5 kHz channels. CQPSK is a compatible differential offset four-level quadrature phase shift keying modulation scheme. The P25 standard provides a symbol transmission rate of 4800 baud using two bits per symbol regardless of whether the channel is modulated using C4FM or CQPSK.

As discussed above, there are many different ways for baseband signals to be RF modulated to be transmitted on a wireless network. The receiver will know what modulation scheme has been used and, hence, will know how to demodulate the signals to recover the baseband signals. However, it is still necessary to synchronize the receiver with the transmitter, so that the receiver is able to sample the received RF signal correctly to recover the baseband signals. In a push to talk wireless communication channel, such as used in an APCO 25 or TETRA network, the receiver must re-synchronize to the transmitter on every transmission burst. Similarly, in a TDMA system, a receiver may only receive symbols during a short period and, hence, must re-synchronize with the transmitter periodically. In GSM, the receiver will need to synchronize with the transmitter on every packet. GSM also provides for synchronization in the middle of the packet.

Synchronization of the receiver with the transmitter enables the receiver to sample the received demodulated symbol stream at the correct frequency and at the correct position within the symbol interval. Ideally, the receiver should sample the received symbol stream at the point of minimum inter-symbol interference, which is commonly referred to as the point of maximum eye opening. The term "timing frequency" will be used herein to refer to how often the receiver should sample the symbol stream, and the term "timing phase" will be used herein to refer to the position within the symbol interval where the receiver should sample the symbol. The process of synchronizing the receiver with the transmitter will be referred to herein as "timing recovery." Depending on how the receiver is implemented, timing recovery may involve recovery of the timing phase only, or recovery of both the timing frequency and timing phase.

There are multiple ways of synchronizing the receiver and transmitter. One of the common ways of doing this is to allow the receiver to extract the clock signal from the received data signal. While doing this avoids the use of a separate synchronization timing signal, it requires a portion of the data channel to be allocated to timing recovery. For example, at the beginning of a burst of data (or during the transmission of data in the case of GSM), the transmitter may transmit a sequence of known symbols, referred to hereafter as a "training sequence," that may be used to synchronize the receiver to enable the receiver to learn the symbol phase and correct the timing frequency. Symbols transmitted during the training sequence will be referred to herein as "training symbols." Since the transmission of a training sequence uses spectrum from the data transmission channel, it is desirable to minimize the amount of spectrum that is used to synchronize the transmitter and receiver. Accordingly, it is common to try to reduce the number of training symbols that must be transmitted during the training sequence to maximize an amount of the data channel that may be used for the transmission of data.

One way to implement timing recovery is to perform a fast Fourier transform on the received signal, look at the frequency components of the signal, and deduce the signal timing from the relative strengths of the frequency components. This type of timing recovery is commonly implemented in WiMax networks and is expected to be used in LTE networks. While this process works well given sufficient processing power, not all handheld devices may be provided with sufficient processing power to implement this method.

Another way to implement timing recovery is to sample the received signal multiple times during each expected symbol interval during the training sequence, and compare the perceived symbols with an expected symbol pattern. Recovery of signal timing using this method is commonly referred to as Maximum Likelihood Estimation (MLE).

When MLE is used to perform timing recovery, it is common to sample the received signal very frequently, on the order of 1000 times per symbol interval, to obtain a fairly high resolution pattern of the received symbols. This representation is compared with an expected symbol representation and the result may be used to adjust a Phase Locked Loop (PLL) at the receiver to adjust the frequency and phase of the receiver. Generally, this process is performed on each training symbol independently and the process is iterated for each training symbol of the training sequence to enable the receiver to incrementally synchronize its frequency and phase with the transmitter.

Sampling the received RF signal very frequently, for example on the order of 1000 times per expected symbol interval, requires significant processing power. To reduce the complexity of the processing circuitry, it would be advantageous to implement maximum likelihood estimation for timing recovery using a much lower symbol sampling rate. However, when a lower sampling rate is used to perform timing recovery, the timing recovery process is more prone to find false lock points and exhibit positive feedback behavior at symbol boundaries. Thus, if the number of samples taken per expected symbol interval is reduced, to reduce the processing required at the transmitter, it becomes necessary to increase the number of training symbols that are required to be transmitted to enable timing recovery to be accurately implemented. Increasing the number of training symbols, of course, impacts the amount of data which may be transmitted on the data channel. Accordingly, it would be advantageous to provide a network, base transceiver station, and mobile station, that would enable the baseband signal timing to be recovered using a relatively low sampling rate to minimize the required processing power of the receiver, while still minimizing the number of training symbols that must be transmitted during the training sequence, to enable the throughput on the wireless channel to be maximized.

SUMMARY OF THE INVENTION

Baseband recovery in wireless networks, base transceiver stations, and wireless networking devices may be implemented to minimize the number of timing symbols while at the same time enabling wireless devices to use a relatively low per-symbol sampling rate, so that minimal processing is required to implement the timing recovery. In one embodiment, a relatively low number of samples are taken per expected symbol interval during the training sequence. A subset of the samples is selected and processed to determine error signals for each of the samples. The error signals are multiplied by the expected symbol and summed to form an error signal. The error signal is used to adjust the set of samples that will be used and processed in connection with subsequent symbols. The error signal is also used to interpolate between available samples to infinitesimally approach the point of maximum eye opening.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
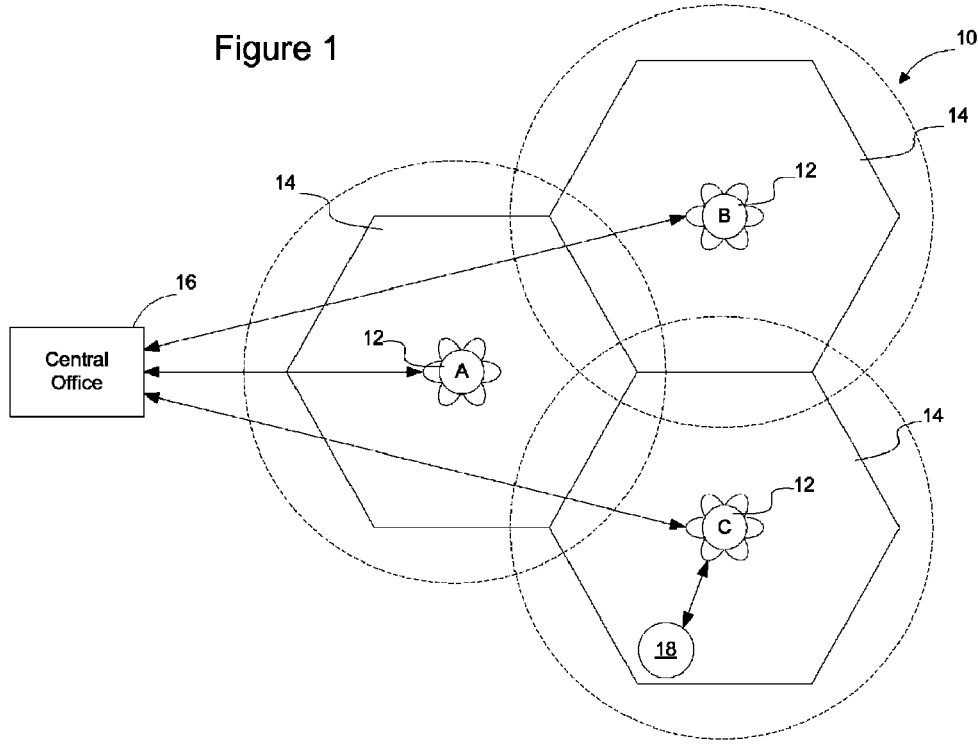
FIG. 1 is a functional block diagram of a portion of an example wireless communication network configured to implement baseband recovery according to an embodiment of the invention.

FIG. 1 illustrates a portion of a wireless transmission network 10 in which three adjacent base transceiver stations (BTSs) 12 are each configured to provide wireless service to coverage areas 14 referred to herein as cells. Due to the nature of wireless communication networks, transmissions from adjacent BTSs 12 commonly overlap each other (as indicated by the dashed circles on FIG. 1) so that there is geographical coverage continuity between adjacent cells, although adjacent cells may occasionally not overlap due to particular geographic conditions and network deployment. While three adjacent cells have been shown in this network to illustrate the embodiments of the invention, a typical network would be likely to include many more BTSs servicing many more cells 14.

The BTSs 12 communicate with a central office 16 or other centralized source of data to enable voice conversations and data transmissions to take place between the higher bandwidth services interfaced by the central office and the BTSs. The central office may interface the Internet, Public Switched Telephone Network (PSTN), or other communication network. Transmission between the central office 16 and the BTSs 12 may take place over a passive optical network, a wireless network, or any other type of network in a conventional manner. The invention is not limited to any particular implementation of how the BTSs and central office are interconnected.

The base transceiver stations 12 transmit RF modulated signals to user equipment within their area of coverage. For example, base transceiver station 12C is shown as transmitting signals to wireless networking device 18 and receiving signals transmitted by wireless networking device 18. Since both the wireless networking device and base transceiver station may transmit signals on the wireless network, the baseband recovery process described in greater detail herein may be implemented by either or both of the wireless networking device and base transceiver station in FIG. 1. The term "wireless networking device" as used herein is defined as a telephone, personal digital assistant, laptop computer, customer premises equipment or other computing device other than a base transceiver station that is capable of transmitting and receiving signals on the wireless network 10. In a typical wireless network, each base transceiver station may be responsible for handling communication with multiple wireless networking devices. These devices may roam between base transceiver stations and be mobile within the network 10 as is well known in the art.

Figure 2:
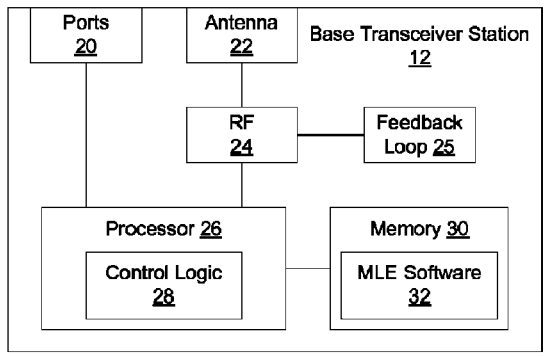
FIG. 2 is a functional block diagram of a portion of an example wireless base transceiver station configured to implement baseband recovery according to an embodiment of the invention.

FIG. 2 is a functional block diagram of a portion of an example wireless base transceiver station 12 configured to implement baseband recovery according to an embodiment of the invention. In the embodiment shown in FIG. 2, the base transceiver station 12 includes one or more ports 20 configured to communicate with the central office 16. The base transceiver station 12 also includes one or more antennas 22 configured to transmit and receive RF signals on the wireless network to enable the base transceiver station to communicate with one or more wireless networking devices 18 within its coverage area. A RF modulator 24 is provided to modulate baseband signals in accordance with the wireless standard being implemented on the network. The RF modulator may also demodulate signals to perform baseband recovery. Operation of the demodulator may be controlled by a feedback loop 25 configured to implement timing recovery using maximum likelihood estimation. For example, as discussed below, one of the feedback systems shown in FIG. 10 or 11 may be used to implement the feedback loop 25.

The base transceiver station 12 also includes a processor 26 containing control logic 28 configured to perform functions described herein to enable the BTS to recover baseband signals from RF modulated signals received from the wireless network. The base transceiver station 12 includes a memory 30 containing data and instructions that may be loaded into control logic 28 to enable the processor 26 to perform the functions associated with timing recovery described in greater detail herein. For example, the memory 30 may include Maximum Likelihood Estimation (MLE) software 32 to enable the base transceiver to sample the received signals during the training sequence, and implement MLE to perform timing recovery as discussed in greater detail below. The base transceiver station may include other software and hardware components as well to enable it to perform other functions on the network.

Figure 3:
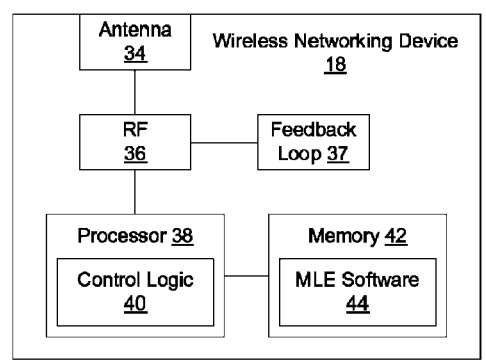
FIG. 3 is a functional block diagram of a portion of an example wireless networking device configured to implement baseband recovery according to an embodiment of the invention.

FIG. 3 is a functional block diagram of a portion of an example wireless networking device 18 configured to implement baseband recovery according to an embodiment of the invention. In the embodiment shown in FIG. 3, the wireless networking device 18 includes one or more antennas 34 configured to transmit and receive RF signals on the wireless network to enable the wireless networking device to communicate with one or more neighboring base transceiver stations 12 or other wireless networking devices 18. An RF modulator 36 is provided to modulate baseband signals in accordance with the wireless standard being implemented on the network. The RF modulator may also demodulate signals to perform baseband recovery. Operation of the demodulator may be controlled by a feedback loop 37 configured to implement timing recovery using maximum likelihood estimation. For example, as discussed below, one of the feedback systems shown in FIG. 10 or 11 may be used to implement the feedback loop 37.

The wireless networking device 18 also includes a processor 38 containing control logic 40 configured to perform functions described herein to enable the wireless networking device to recover baseband signals from RF modulated signals received from the wireless network. The wireless networking device 18 includes a memory 42 containing data and instructions that may be loaded into control logic 40 to enable the processor 38 to perform the functions associated with timing recovery described in greater detail herein. For example, the memory 42 may include Maximum Likelihood Estimation (MLE) software 44 to enable the wireless networking device to sample the received signals during the training sequence, interpolate between samples, and implement MLE to perform timing recovery as discussed in greater detail below. The wireless networking device may include other software and hardware components as well to enable it to perform other functions on the network.

Figure 4:
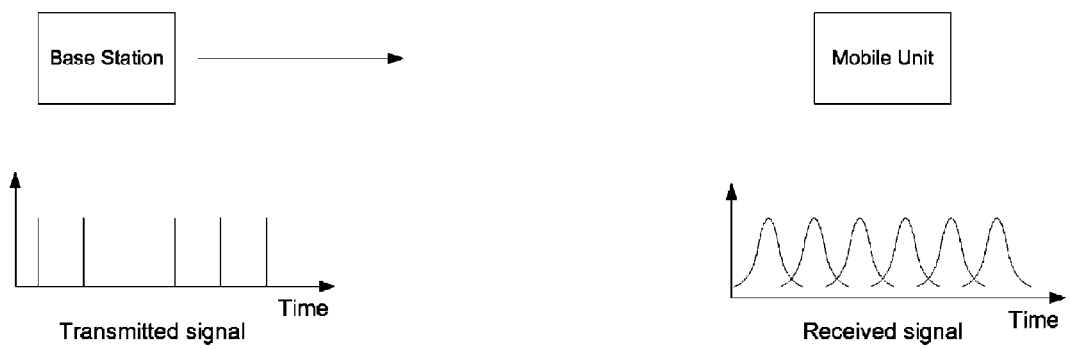
FIG. 4 is a functional block diagram showing an example way in which signals may be transmitted, and in which the signals may degrade during transmission on a wireless network.

FIG. 4 is a functional block diagram showing an example way in which signals may be transmitted, and in which the signals may degrade during transmission on a wireless network. As shown in FIG. 4, a transmitter may transmit RF modulated baseband signals on a wireless network. The signals may be nicely formed when initially transmitted. However, as the signals propagate through the air and are received at the receiver, multiple factors may combine to distort the transmitted signal and add noise to the transmitted signal. Thus, the received signal may appear very different than the transmitted signal. One important factor is inter-symbol interference. To minimize the impact of inter-symbol interference, it is desirable to sample the received signal at the point of maximum eye opening.

Figure 5:
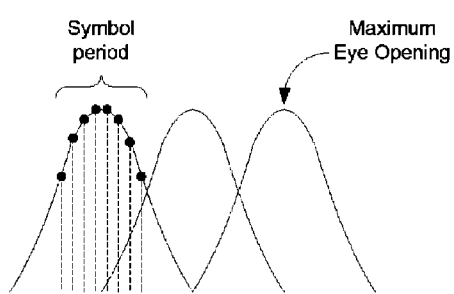
FIG. 5 is an expanded view of a portion of the received signal of FIG. 4, showing how the receiver may sample the received signal during an expected symbol interval to determine the frequency of the received signal and the point of maximum eye opening.

FIG. 5 is an expanded view of a portion of the received signal of FIG. 4, showing how the receiver may sample the received signal during an expected symbol interval to determine the frequency of the received signal and the point of maximum eye opening. As shown in FIG. 5, the received signal will have a frequency that is related to the symbol period. Within the symbol period, there is a point where the inter-symbol interference is at a minimum. This point is referred to as the point of maximum eye opening. As discussed in greater detail below, an object of timing recovery is to learn the frequency of the incoming signal, as well as to locate the point of maximum eye opening, so that the receiver knows when, within the symbol interval, it should sample the symbol. When the frequency of the incoming signal is known, the timing recovery may be constrained to only seeking the point of maximum eye opening within the expected symbol period.

According to an embodiment of the invention, a relatively low number of samples (represented by black dots) may be taken during each expected symbol interval during the training sequence. The terms "relatively low number of times" and "relatively low number of samples" are defined herein to include a sampling frequency of between about 4 samples per sampling window to up to approximately 30 samples per sampling window, and more particularly between about 8 and 15 samples per sampling window. In one embodiment, the relatively low number of samples is approximately 10 times oversampling. These are not to be construed as absolutely fixed limits, but rather are selected as approximations. A larger number of samples, such as 1000 samples per sampling window, will result in a very high precision determination of the incoming waveform. However, this also requires a large amount of processing power. For example, in FIG. 5, 8 samples of the RF signal have been shown as being taken during one expected symbol interval. The samples may be processed as described below to enable Maximum Likelihood Estimation to be used to recover timing on the channel using the relatively low number of samples.

FIGS. 6-9 show a process of using Maximum Likelihood Estimation (MLE) to perform timing recovery with a relatively low number of samples per expected symbol interval according to an embodiment of the invention. As discussed above, at the beginning of transmission of a packet, a series of training symbols will be transmitted by the transmitter to enable the receiver to perform timing recovery on the channel. The receiver knows the sequence of training symbols to be transmitted and, hence, can use the known sequence to perform Maximum Likelihood Estimation to determining timing from the training sequence.

In Maximum Likelihood Sequence Estimation, a received waveform is compared with one or more anticipated possible waveforms, to see which anticipated waveform best matches the received waveform. Where MLSE is used for data recovery, the timing is known and the received waveform is compared against a relatively large number of possible waveforms to learn what data symbol is likely to have been transmitted. For example, assume there are 16 possible waveforms corresponding to 16 possible symbols. When the receiver receives a symbol it will measure the received waveform and compare the received waveform against the possible known waveforms. The receiver will look to see which of the known waveforms best matches the received waveform and assume that the symbol associated with the matching known waveform is the correct symbol. The receiver will perform this process during each symbol interval to deduce the series of symbols that were transmitted by the transmitter.

Maximum Likelihood Estimation may also be used to implement timing recovery using a similar process. Specifically, to use MLE to do timing recovery, the transmitter transmits a known series of training symbols. The receiver knows what symbols will be transmitted and, hence, knows what the waveform should look like. When it starts to receive the waveform, it will compare the received waveform with the waveform of the known training symbols, to try to match the two. This enables the receiver to adjust the frequency of its PLL or other clock so that the receiver is operating at the same frequency as the transmitter. Additionally, this enables the receiver to adjust when it is reading the symbol, within the symbol period, so that it is able to read the symbol at a place where there is minimal inter-symbol interference.

FIGS. 6-9 conceptually illustrate how a comparison of a received waveform with an expected waveform may be used to adjust the frequency and phase at the receiver. The mathematical way in which this may be performed, and several feedback loops that may be created to implement this process according to embodiments of the invention, will be discussed in greater detail below in connection with FIGS. 10-13.

Figure 6:
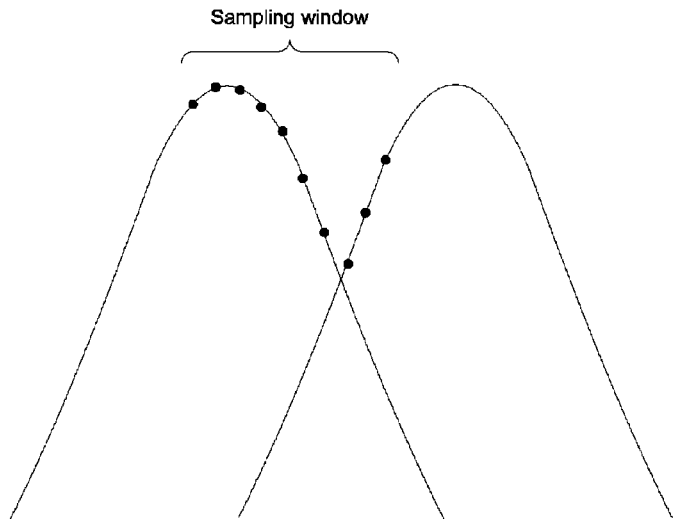
FIGS. 6-9 show a process of using Maximum Likelihood Estimation (MLE) to perform timing recovery with a relatively low number of samples per symbol interval according to an embodiment of the invention.

As shown in FIG. 6, the receiver will initially start to receive an incoming RF waveform. The receiver at this point knows that the waveform represents a series of training symbols but does not know the frequency that was used to generate the training symbols and does not know where one symbol ends and the next symbol begins.

Thus, as shown in FIG. 6, the receiver will start sampling and will sample the received waveform a relatively low number of times during an initial sampling window, which corresponds to a period of time that the receiver expects to approximately correspond to about one symbol period. The sampling window is initially set based on an estimated frequency of the incoming window to be approximately one symbol period long. Where the receiver is reasonably confident of the incoming frequency, the receiver may maintain a constant sampling window and not perform frequency recovery. In this embodiment, the receiver is only looking to find the place within the sampling window where the point of maximum eye opening occurs. The size of the sampling window may also be adjusted where the receiver is also synchronizing frequency as well as phase. Whether the receiver performs frequency recovery and phase recovery, or only implements phase recovery, will depend on the particular implementation of the receiver.

Figure 7:
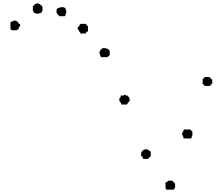

According to an embodiment of the invention, as shown in FIG. 7, rather than take 1000 or other arbitrarily large number of samples per expected symbol period, applicants propose to take a relatively low number of samples and perform post processing on the samples to determine more accurately, from the relatively small number of samples, the location of the point of maximum eye opening.

Figure 8:
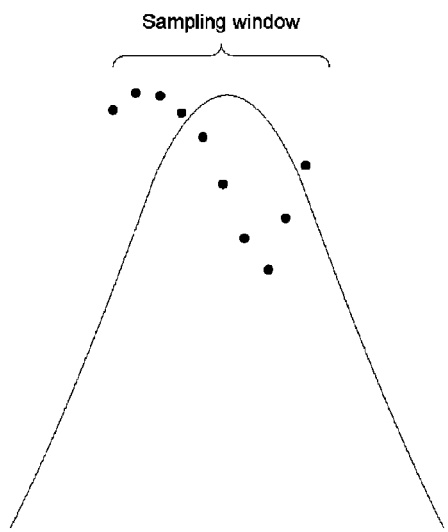
Figure 9:
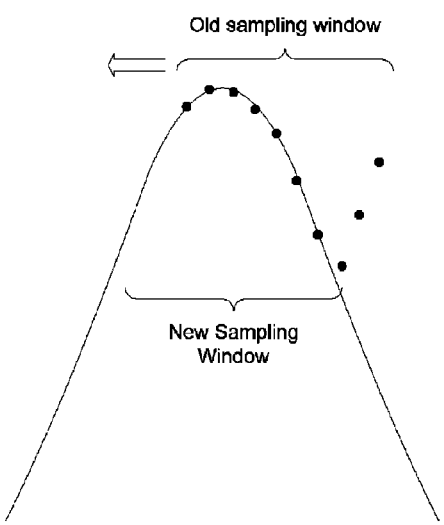

As shown in FIG. 8, after obtaining the samples, the received waveform is compared with an expected waveform to adjust the sampling window. As shown in FIG. 9, based on this comparison, the size (duration) of the sampling window may be adjusted to adjust the frequency of the symbols, and the location of the sampling window may be adjusted relative to the incoming waveform to approach the point of maximum eye opening. This process will be iterated for each symbol during the training period during which training symbols are transmitted to enable the receiver to be synchronized with the transmitter.

Figure 10:
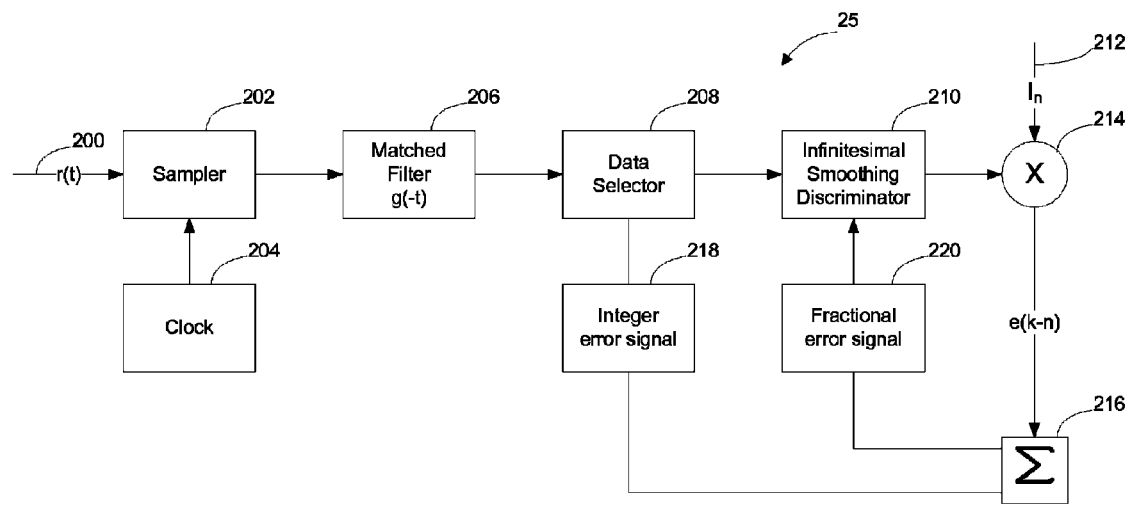
FIGS. 10 and 11 show two example feedback loops that may be used to implement embodiments of the invention.

FIG. 10 shows a feedback system that may be used to implement an embodiment of the invention. As shown in FIG.

10, a received signal r(t) 200 will be received by a network element e.g. via antenna 34 and sampled using a sampler 202. The sampler may be, for example, an analog to digital converter configured to sample the incoming waveform a relatively low number of times during each expected symbol period. For example, as discussed above, the sampler may sample the incoming waveform on the order of 10 times per expected symbol period (10 times oversampling) or other relatively low number of times. In this embodiment the phase and frequency of the clock that operates the sampler is not influenced by the error signal from block 216. The base frequency of the clock (204) is however set as close to the expected symbol rate, or a multiple thereof, as possible.

Figure 11:
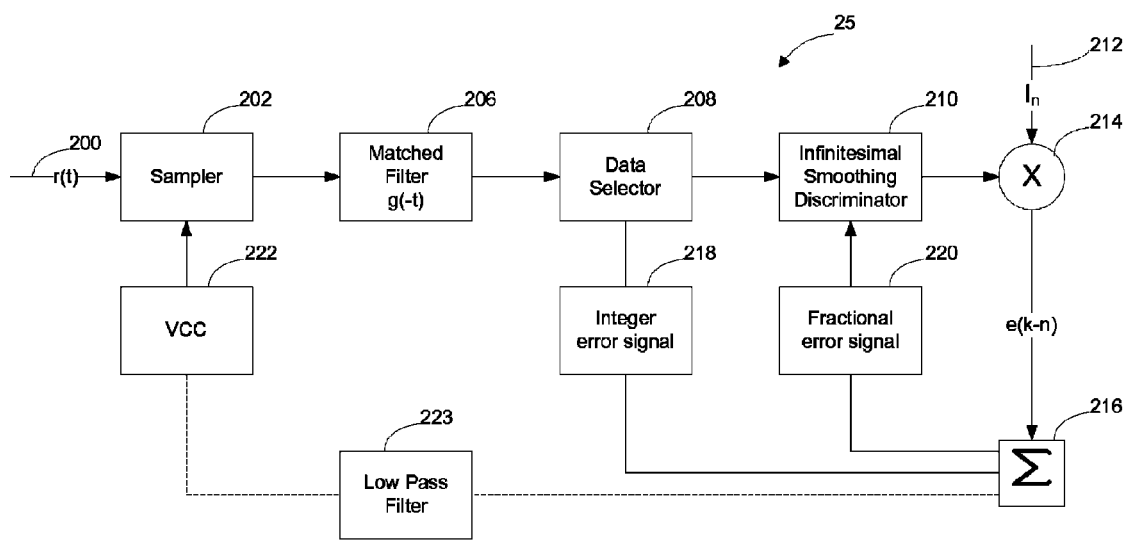

In one embodiment, the sampler is driven using a clock 204 that operates to sample the input signal at its own frequency which is independent of the feedback loop discussed below. FIG. 11 shows another embodiment where the frequency or phase of the clock is controlled by the feedback loop. The clock's base rate may be tuned to cause the sampler to sample the input waveform approximately ten times per symbol, or to sample the input waveform another relatively low number of times per symbol. The clock's phase and frequency may be caused to deviate from the base settings by the error signal provided by block 216. Since the clock is dependent on the feedback loop in this embodiment (FIG. 11) the discrete voltage controlled clock thus operates dependant upon the signal from block 223 and post processing of the digitized samples is used to implement timing recovery as well as to better match the phase and frequency of the sampling clock (222) to the incoming symbol stream.

Returning to FIG. 10, the digitized waveform sampled by the sampler 202 is input to a matched filter 206. The matched filter may be, for example, a digital finite impulse response matched filter or another type of filter. The matched filter 206 functions to remove noise and acts to smooth the input samples in much the same way as a low pass filter operates on an analog signal.

The filtered samples are input to a data selector 208. The data selector selects which of the relatively low number of samples (per symbol) should be used as inputs to the control loop. For example, for a given symbol that is to be detected, the data selector will select several of the available samples which will be processed to determine the error signal. Assume, for example, that the sampler 202 is operating to sample the input signal r(t) ten times per symbol period. The data selector may select five of those samples that the data selector believes are closest to the maximum eye opening. If the data selector has selected the five samples that are closest to the maximum eye opening, the feedback loop will cause the data selector to continue to select those five samples. If the error accumulated in the feedback loop is sufficient, however, the feedback loop will cause the data selector to move one symbol ahead or one symbol back to choose a different set of five samples. The feedback will be described in greater detail below. Thus, the data selector uses an integer portion 218 of the feedback signal to move an integer number of samples in either direction (forward or backward) to select an integer number of samples that are closest to the maximum eye opening.

The data selector thus is responsible for selecting a contiguous set of samples that are closest to the maximum eye opening. The integer portion 218 of the feedback loop will be used to adjust the data selector to cause the data selector to select a different group of samples or to continue selecting the same group of samples from subsequent waveforms. However, the data selector is only able to be adjusted by causing the data selector to select new groups of samples. It may be that the point of maximum eye opening lies somewhere between the samples rather than directly on top of one of the available samples. In this instance, the data selector is not able to determine the exact point of maximum eye opening by selecting a different group of samples.

The relatively low sampling rate thus prevents the data selector from obtaining the precise location of the point of maximum eye opening. While a higher sampling rate would enable the point of maximum eye opening to be more closely determined, increasing the sampling rate increases the cost and complexity of the system, which is undesirable.

To determine the point of maximum eye opening more precisely, the output of the data selector is input to an infinitesimal smoothing discriminator 210. The infinitesimal smoothing discriminator is controlled using a fractional part of an error signal 220 from the feedback loop to determine where, between the available samples, the point of maximum eye opening occurs within the group of samples.

The output of the infinitesimal smoothing discriminator is multiplied by an input signal $I_n$ 214 at a multiplier 216. The input signal $I_n$ 214 is the expected symbol. In a modulation scheme using a four level modulation process, the expected symbols are generally +3, +1, −1, and −3. However, in many four level modulation schemes, such as APCO 25 (TETRA), the training symbols transmitted during the training sequence in this type of modulation scheme are generally +3 and −3. Since a maximum likelihood timing estimation process is being used to implement timing recovery, the expected values of the training symbols will be input as the input signal $I_n$ 214.

Multiplying the output of the infinitesimal smoothing discriminator with the training symbol, which has a positive or negative sign, enables the error signal formed by the product to be always positive regardless of the training symbol. For example, if a positive symbol is being received and the first derivative of the symbol signal at the symbol's presumed maximum eye opening is positive, the point of maximum eye opening is to the right of the sample position. Conversely, if a negative symbol is being received, and the first derivative of the symbol signal is positive at the presumed maximum eye opening point, the point of maximum eye opening is to the left of the sample position. By multiplying the calculated derivative with the expected symbol value (positive or negative) the effect of symbol polarity may be eliminated to simplify the operation of the error accumulator.

Figure 14:
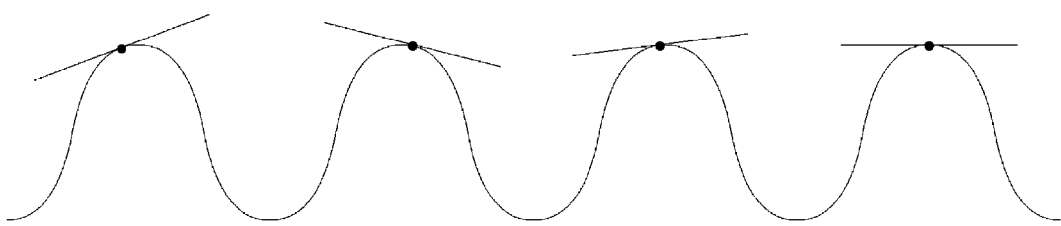
FIG. 14 shows the calculation of first derivative values at selected sampling points on a stream of successive symbols according to an embodiment of the invention.
Figure 15:
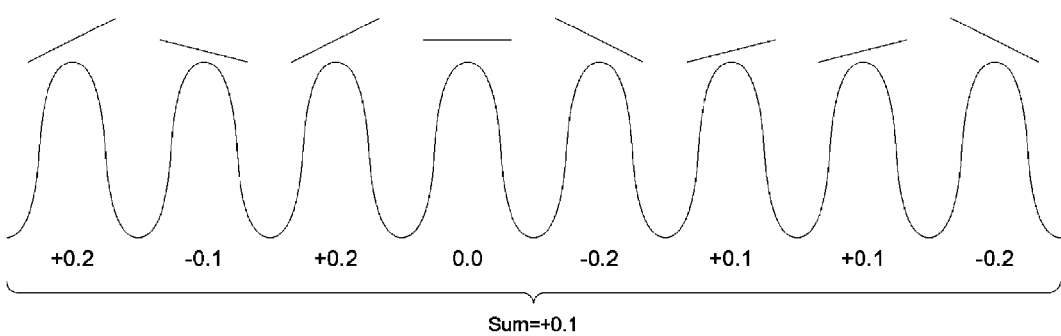
FIG. 15 shows the accumulation of error from a plurality of first derivative values of successive symbols according to an embodiment of the invention.

The received signal multiplied by the input expected symbol is passed to an error accumulator 216. The error accumulator sums the error over a particular number of symbols to determine the error associated with the selected group of samples. FIGS. 14 and 15 show example waveforms to illustrate graphically how this works. Once per symbol period block 210 produces an error value. The error accumulator sums the error signal from block 210 over a particular number of symbols. In one particular implementation a number of symbols between 8 and 13 was found to work best. The error signal error signal ($\epsilon$) for a given symbol K is a function of the symbol decision $I_n$, and the error value produced by block 210

$$\epsilon k = ISD(k)*I_n \text{ or } \epsilon k = dv/dt*I_n.$$

Figure 12:
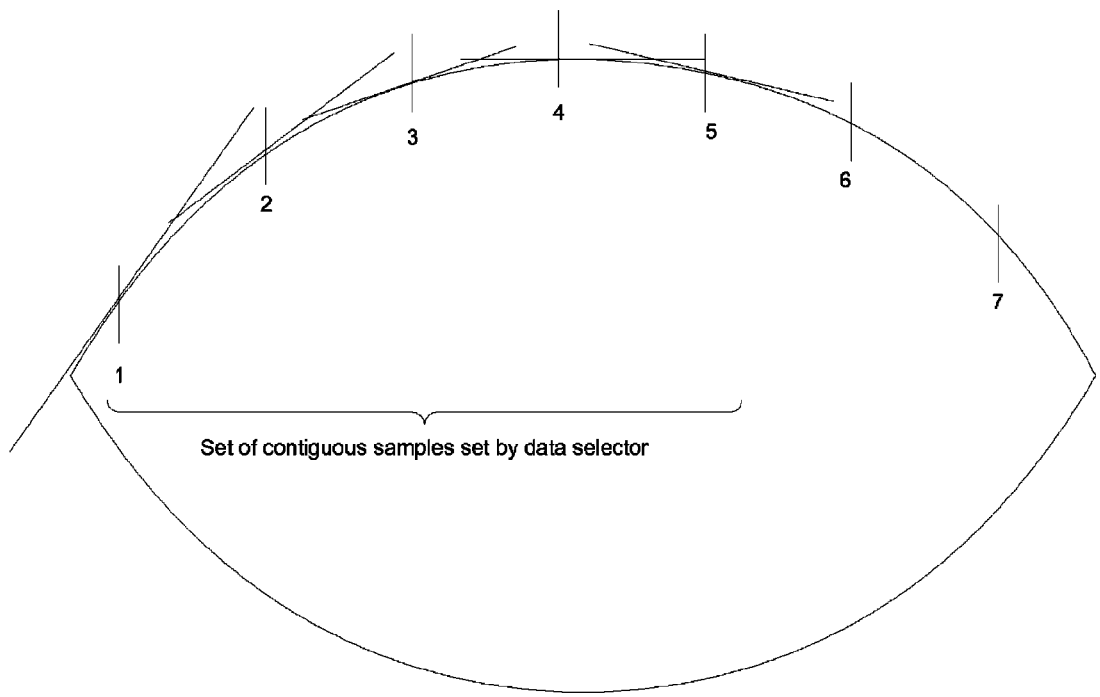
FIG. 12 illustrates a portion of a hypothetical signal showing the selection of a plurality of sampling points on a symbol according to an embodiment of the invention.
Figure 13:
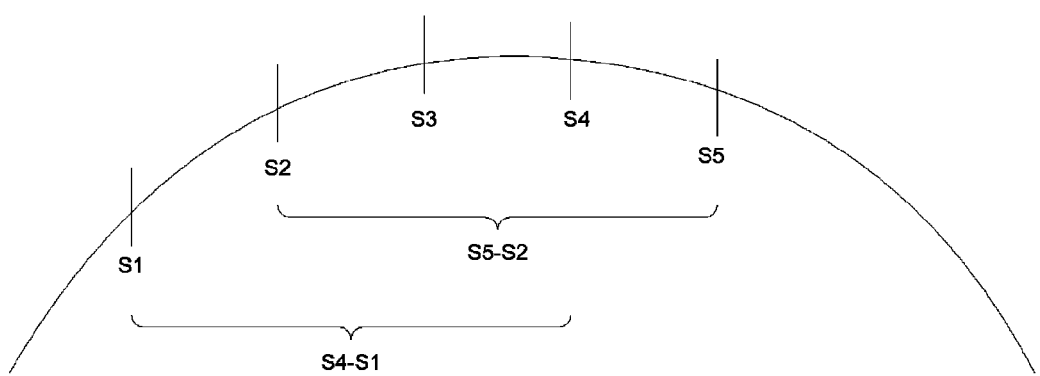
FIG. 13 illustrates operation of an infinitesimal smoothing discriminator according to an embodiment of the invention.

The ISD block 210 operates as follows. Based on the fractional value provided by block 220 "α" a discrimination (derivative determination) and smoothing is applied to the incoming symbol sampled waveform by applying the following function to the five samples selected by block 208. This group of five symbols is shown in FIG. 12. Let us presume that the values of these five samples are S1 S2 S3 S4 and S5 respectively, as shown in FIG. 13. Block 210 produces and error value from these samples which approximates the first derivative about sample S3 as follows: $dv/dt=Ks*[(1-\alpha)(S4-S1)+\alpha(S5-S2)]$ where $\alpha$ is the fractional value provided by block 220, and Ks is a constant determined experimentally during the development of the system. Thus $\epsilon k=dv/dt*I_n$ If the data selector has selected a group of samples on either side of the maximum eye opening, the calculated derivative will be approximately zero. By the same token, successive values from the output of block 210 in FIG. 10 when multiplied by the respective "$I_n$" will sum to approximately zero when sample S3 of each symbol period is approximately at the maximum eye opening point FIG. 14 shows the first derivative values of successive symbols and FIG. 15 shows the summation of the first derivative values over a group of symbols. As shown in FIG. 15, the first derivative for successive symbols may be expected to be approximately equal and opposite thus summing to approximately zero where the system is tuned to the point of maximum eye opening.

The error accumulator 216 accumulates the error for samples from a particular number of symbols by adding the derivative of each of the symbols multiplied by "$I_n$". The error accumulator 216 thus accumulates the error from multiple symbols, for example as shown in FIG. 15.

The error accumulator outputs two values to provide closed loop feedback to the data selector 208 and to the infinitesimal smoothing discriminator 210. Specifically, the error accumulator 216 feeds the integer portion of the error signal 218 into the data selector 208 to cause the data selector to control which set of samples are used and, if necessary, to select a different set of samples from the available relatively low number of samples. The error accumulator also feeds the fractional part of the error signal 220 into the infinitesimal smoothing discriminator to enable the maximum eye opening point within the sampling window to be determined. The integer portion of the error signal may be calculated using the following formula:

$$\delta = INT[Ke*\Sigma(\epsilon(k-n)\ldots\epsilon k)]$$

where Ke is an error constant, $\epsilon(k-n)$ is the derivative multiplied by the estimated maximum likelihood symbol $I_n$ at sample (k-n), and $\Sigma(\epsilon(k-n)\ldots\epsilon k)$ is the sum of the error signals at each of the selected symbol sampling points. The integer portion is used by the data selector to determine whether it should change which set of samples it is using. For example, if the sum of the derivatives yields a positive value, the integer value of the error signal will be input as a feedback to the data selector to cause the data selector to select a new set of samples during the next sampling interval. Thus, the integer portion may cause the data selector in this example to select samples further to the right in each symbol in successive sample sets. Likewise, the fractional portion of the error signal will be used to adjust $\alpha$, which thus affects the calculation of the first derivative.

If the integer portion of the error signal is not sufficient to cause the data selector to select a new set of samples, then the data selector is sampling the signal around the point of maximum eye opening. To determine where, within the sampling window, the point of maximum eye opening actually occurs, the fractional portion of the error signal is input to the infinitesimal smoothing discriminator. The fractional portion of the error signal 220 may be calculated using the following formula:

$$\alpha = FRAC[Ke*\Sigma(\epsilon(k-n)\ldots\epsilon k)]$$

The infinitesimal smoothing discriminator interpolates between samples of a given symbol to determine where the derivative is approximately zero, which corresponds approximately to the point of maximum eye opening. According to an embodiment of the invention, rather than looking at only one sample on either side of the middle sample and using those two values to determine where the derivative is likely to be zero, the fractional error is used in connection with the amplitude value at multiple samples on either side of the middle sample to determine the derivative at the point of maximum eye opening. For example, in one embodiment, the derivative, at the presumed point of maximum eye opening, may be determined according to the following formula:

$$dv/dt = Ks*[(1-\alpha)(S4-S1)+\alpha(S5-S2)]$$

Other "discrimination/smoothing" formulas and sampling schemes may be used as well. For example, dv/dt may also be calculated using the following formula or another similar formula. Additionally, although in this embodiment five values are used to find the presumed point of maximum eye opening, larger numbers of values may be used as well.

$$dv/dt = Ks*[(1-\alpha)(S3-S1)+\alpha(S4-S2)]$$

An illustration of this is shown in FIG. 13. In FIG. 13, the amplitude at each of five samples has been shown as S1, S2, S3, S4, and S5. It has been assumed that the middle sample, of the group of five samples selected by the data selector, will be relatively close to the point of maximum eye opening. This is a fair assumption, since the integer portion of the error signal has indicated that the correct group of five symbols has been selected. Accordingly, in determining the point of maximum eye opening, the derivative at the middle sample may be assumed to be relatively close to zero and, when adjusted by smoothing factor $\alpha$ will be as close as possible to the derivative at the true maximum eye opening point. The point of maximum eye opening has been truly reached when the derivative is approximately zero, or when the sum of the derivative at this point for successive symbols is approximately zero.

The amplitude of the other samples is used to calculate the first derivative of the symbol signal at the point of maximum eye opening. According to an embodiment of the invention, the fractional part of the error signal $\alpha$ is multiplied with the difference of the amplitudes of sample S5 and S2. Similarly, the fractional part of the error signal $1-\alpha$ is multiplied by the difference of the amplitudes of at samples S1 and S4. These two values are then added together and multiplied by a differential constant, Ks, to closely approximate the first derivative at the point of maximum eye opening. By differentiating samples on either side of the maximum eye opening (e.g. by using S4−S1 and S5−S2) the individual contribution of any one sample to the determination of the derivative at the point of maximum eye opening may be reduced to thereby smooth the derivative calculation of the point of maximum eye opening. This reduces the effect of noise in the calculation, as does averaging successive calculations over a large number of successive symbol samples which is done by summation block 216. By using the fractional portion of the error signal, the contribution of the two respective differences may be used to infinitesimally approach the true derivative at the point of maximum eye opening. Specifically, the fractional portion of the error signal enables the infinitesimal smoothing discriminator to interpolate between adjacent derivatives by adjusting the contribution of the differences to approach the derivative at the point of maximum eye opening even where real physical samples do not exist at this point.

FIG. 11 shows another embodiment of a feedback loop in which a voltage controlled clock 222 is used to control the sampler 202. In this embodiment rather than using a clock operating at a fixed frequency, a voltage controlled clock may be used having a frequency and phase that is controlled according to feedback from the feedback loop. In this embodiment, the frequency and phase at which the input waveform r(t) is sampled may be controlled to thus enable frequency synchronization to be implemented as well as phase synchronization. The frequency and phase synchronization may be implemented using the aggregate averaged error signal from block 216 in a feedback loop similar to the methods described above in connection with FIG. 10. Block 223 in FIG. 11 may be used to further process this aggregate averaged error signal to best achieve phase lock of the voltage controlled clock in block 222 with the incoming symbol stream. In one embodiment, block 223 may be implemented as a low pass filter multiplied by a constant. The low pass filter 223 should be tuned to balance loop response time with loop stability.

The error accumulator may accumulate error over a number of symbol periods to control the VCC 222. For example, if the fractional portion of the error signal is steadily increasing over successive symbol periods, it is likely that the point of maximum eye opening is advanced from sample S3 (phase mismatch). It is also possible that there is a difference in frequency between the incoming symbol rate and the VCC 222 frequency (frequency mismatch). If the point of maximum eye opening is moving (drifting) within the symbol sampling window, the frequency at which the samples are being taken should be adjusted to synchronize with the symbol frequency of the input signal r(t). Specifically, a change in the location of the point of maximum eye opening over time may be used to determine that the frequency is slightly askew. Thus, the error accumulator may adjust the frequency of the VCC 222 to cause the frequency to be adjusted and, hence, to cause the location of the point of maximum eye opening within the sampling window to stabilize. Optionally, a second error accumulator may be used to control the frequency of the VCC 222. Furthermore, if the output of the error accumulator is biased positive or negative this could indicate a phase mismatch which could be compensated for by varying the phase of the VCC block 222 such that sample S3 more closely arrives at the exact time of maximum eye opening. The locking or tracking behavior inherit in the operation of such a feedback loop made up of blocks 216, 223, and 222 in FIG. 11 ensures that both frequency and phase of the incoming symbol stream are tracked accurately once lock is achieved. The benefit of this system is that the outer loop locks the sample decisions for optimum placement at the maximum eye opening while the inner loop makes the best decisions on symbol amplitude at the maximum eye opening, regardless of the samples provided by block 202. Thus a useful signal can be provided to block 222 to better tune the sample position in time before the correct position is known.

The functions described above may be implemented as a set of program instructions that are stored in a computer readable memory within one or more network element(s) and executed on one or more processors within the network element(s). However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A wireless network, comprising:
   at least one base transceiver station;
   at least one wireless networking device;
   wherein at least one of the base transceiver station and the wireless networking device are configured to implement baseband recovery by:
   sampling a received training sequence of training symbols at a relatively low number of times during each estimated training symbol interval to obtain a relatively low number of samples for each estimated training symbol interval,
   selecting a contiguous subset of the relatively low number of samples,
   obtaining a first derivative associated with the subset;
   multiplying the first derivative by an expected data symbol to obtain an error signal for the training symbol interval;
   accumulating error signals from successive training symbol intervals to form an accumulated error signal;
   using a first portion of the accumulated error signal to adjust which of the relatively low number of samples are to be included in the contiguous subset in connection with processing a subsequent training symbol; and
   using a second portion of the accumulated error signal to determine a likely position of a location of maximum eye opening to estimate the timing phase from the training sequence.

2. The wireless network of claim 1, wherein the first portion is an integer portion of the accumulated error signal.

3. The wireless network of claim 1, wherein the second portion is a fraction portion of the accumulated error signal.

4. The wireless network of claim 1, wherein the subset includes at least five sample points, and wherein the first derivative is calculated by adding a first difference of first derivatives of a first set of two of the sampling points with a second difference of first derivatives of a second set of two of the sampling points, the first and second sets being disjoint.

5. The wireless network of claim 1, wherein the error signal is further configured to adjust a clock value, the clock value controlling a frequency with which the received training sequence is sampled.

6. The wireless network of claim 1, wherein multiplying the first derivative by the expected data symbol enables the symbol polarity to be ignored when accumulating error signals from successive training symbol intervals.

7. The wireless network of claim 1, wherein the step of sampling the received training sequence at a relatively low number of times during each estimated training symbol interval causes between about 4 and 30 samples to be obtained for each estimated training symbol interval.

8. The wireless network of claim 1, wherein the step of sampling the received training sequence at a relatively low number of times during each estimated training symbol interval causes between about 8 and 15 samples to be obtained for each estimated training symbol interval.

9. A base transceiver station for use on a wireless network, comprising:
- at least one antenna configured to receive RF signals; and
- a processor connected to the at least one antenna and configured to implement baseband recovery from the RF signals by processing a training sequence of training symbols to recover timing frequency and timing phase from the training sequence, the processor being configured to:
  - sample a received training sequence of training symbols at a relatively low number of times during each estimated training symbol interval to obtain a relatively low number of samples for each estimated training symbol interval,
  - select a contiguous subset of the relatively low number of samples,
  - obtain a first derivative associated with the subset;
  - multiply the first derivative by an expected data symbol to obtain an error signal for the training symbol interval;
  - accumulate error signals from successive training symbol intervals to form an accumulated error signal;
  - use a first portion of the accumulated error signal to adjust which of the relatively low number of samples are to be included in the contiguous subset in connection with processing a subsequent training symbol;
  - and use a second portion of the accumulated error signal to determine a likely position of a location of maximum eye opening to estimate the timing phase from the training sequence.

10. The base transceiver station of claim 9, wherein the first portion is an integer portion of the accumulated error signal.

11. The base transceiver station of claim 9, wherein the second portion is a fraction portion of the accumulated error signal.

12. The base transceiver station of claim 9, wherein the subset includes at least five sample points, and wherein the first derivative is calculated by adding a first difference of first derivatives of a first set of two of the sampling points with a second difference of first derivatives of a second set of two of the sampling points, the first and second sets being disjoint.

13. The base transceiver station of claim 9, wherein the error signal is further configured to adjust a clock value, the clock value controlling a frequency with which the received training sequence is sampled.

14. The base transceiver station of claim 9, wherein multiplying the first derivative by the expected data symbol enables the symbol polarity to be ignored when accumulating error signals from successive training symbol intervals.

15. A wireless networking device for use on a wireless communication network, comprising:
- at least one antenna configured to receive RF signals;
- and a processor connected to the at least one antenna and configured to implement baseband recovery from the RF signals by processing a training sequence of training symbols to recover timing frequency and timing phase from the training sequence, the processor being configured to:
  - sample a received training sequence of training symbols at a relatively low number of times during each estimated training symbol interval to obtain a relatively low number of samples for each estimated training symbol interval,
  - select a contiguous subset of the relatively low number of samples, obtain a first derivative associated with the subset;
  - multiply the first derivative by an expected data symbol to obtain an error signal for the training symbol interval;
  - accumulate error signals from successive training symbol intervals to form an accumulated error signal;
  - use a first portion of the accumulated error signal to adjust which of the relatively low number of samples are to be included in the contiguous subset in connection with processing a subsequent training symbol; and
  - and use a second portion of the accumulated error signal to determine a likely position of a location of maximum eye opening to estimate the timing phase from the training sequence.

16. The wireless networking device of claim 15, wherein the first portion is an integer portion of the accumulated error signal.

17. The wireless networking device of claim 15, wherein the second portion is a fraction portion of the accumulated error signal.

18. The wireless networking device of claim 15, wherein the subset includes at least five sample points, and wherein the first derivative is calculated by adding a first difference of first derivatives of a first set of two of the sampling points with a second difference of first derivatives of a second set of two of the sampling points, the first and second sets being disjoint.

19. The wireless networking device of claim 15, wherein the error signal is further configured to adjust a clock value, the clock value controlling a frequency with which the received training sequence is sampled.

20. The wireless networking device of claim 15, wherein multiplying the first derivative by the expected data symbol enables the symbol polarity to be ignored when accumulating error signals from successive training symbol intervals.

* * * * *